Figure 1A:
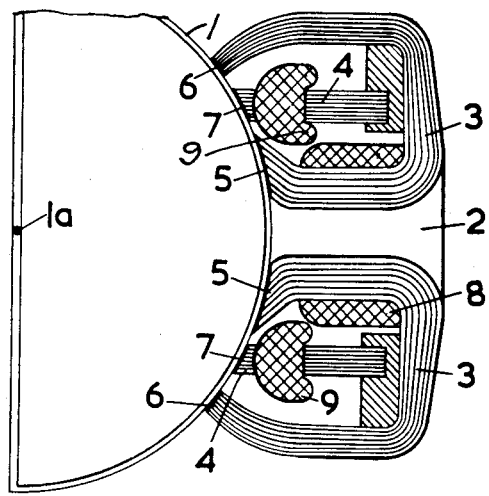

April 12, 1960  S. JONES ET AL  2,932,752
TORQUE MOTORS

Filed Aug. 20, 1956  2 Sheets-Sheet 1

Inventors
SYDNEY JONES and
By ROBERT E. GLADING

ATTORNEYS

April 12, 1960　　　S. JONES ET AL　　　2,932,752
TORQUE MOTORS

Filed Aug. 20, 1956　　　　　　　　　　2 Sheets-Sheet 2

Inventors
SYDNEY JONES and
By ROBERT E. GLADING
Stevens, Davis, Miller & Mosher
ATTORNEYS

United States Patent Office 2,932,752
Patented Apr. 12, 1960

2,932,752

TORQUE MOTORS

Sydney Jones, Great Malvern, and Robert Edward Glading, Hanley Swan, England, assignors to National Research Development Corporation, London, England, a British corporation Application August 20, 1956, Serial No. 605,070

19 Claims. (Cl. 310—166)

This invention relates to torque motors and has reference to such motors for use in situations where it is required to rotate a body simultaneously or separately around two mutually perpendicular axes, e.g. for precessing gyroscopes.

One method of electrically precessing a gyroscope is by means of two torque motors mounted with their axes mutually perpendicular and adapted to apply torques to the gyroscope about these axes. One motor is mounted on the gyroscope gimbal ring so that its axis remains fixed at right angles to the groscope spin axis. The second motor is mounted on the frame that supports the gyroscope so that its axis remains perpendicular to that of the first motor but not to the gyroscope axis. The gyroscope precesses according to control signals applied to the motors.

When signals for precessing a gyroscope are related to Cartesian coordinates, for example separate azimuth and elevation signals, the foregoing system is convenient, but if, as often happens, the signal is originally derived in the form of polar coordinates, i.e. a given displacement in a given direction, it is necessary to resolve the polar signal into rectangular coordinates to obtain suitable signals to apply to the torque motors.

It is an object of the present invention therefore to provide a torque motor capable of developing a torque about an axis over at least a limited angular movement in response to a single phase alternating signal the magnitude and direction of the torque being in accordance with the magnitude and phase of the signal.

According to the invention a torque motor comprises a conductive, magnetic sheet, an electro-magnetic field system for setting up a closed, eddy current path in the sheet, and means for setting up a rotating field flux having an odd number of pole pairs the lines of force cutting the eddy current path, whereby when a single-phase alternating current of frequency equal to that of the rotating field is applied to the field coils the sheet experiences a torque which is determined in accordance with the magnitude of the single-phase alternating current, the magnitude of the rotating field and their relative phase.

Conveniently the sheet member comprises at least part of a hollow sphere supported so as to be rotatable about its centre, the electro-magnetic field system comprises a magnetic circuit having a central pole face surrounded by an annular pole face, the pole faces being separated from the surface of the sphere and in opposing relation thereto, and the means for setting up the rotating field comprises a two-phase, two-pole winding wound on a slotted, annular ring located between the central and annular poles.

The single phase alternating current can be, and often is, a direct measure in phase and amplitude of the polar coordinates of a position error vector, or a velocity vector with which it is desired to precess a gyroscope. Thus the motor develops a torque whose direction and magnitude are determined by the polar coordinates of a vector to which the single phase alternating current is related. For this reason it can conveniently be called a polar motor.

Subsidiary advantages that may arise are that the inertia frequency of the system may be low because the transverse moments of inertia can be made low, that no current carrying leads need be taken to moving parts so avoiding the need for sliprings, and that for a given diameter of available space a larger gyroscope may be housed.

Figure 2A:
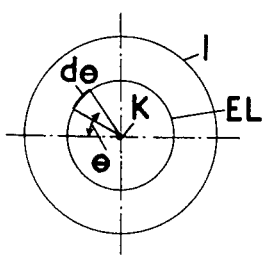
Figure 3:
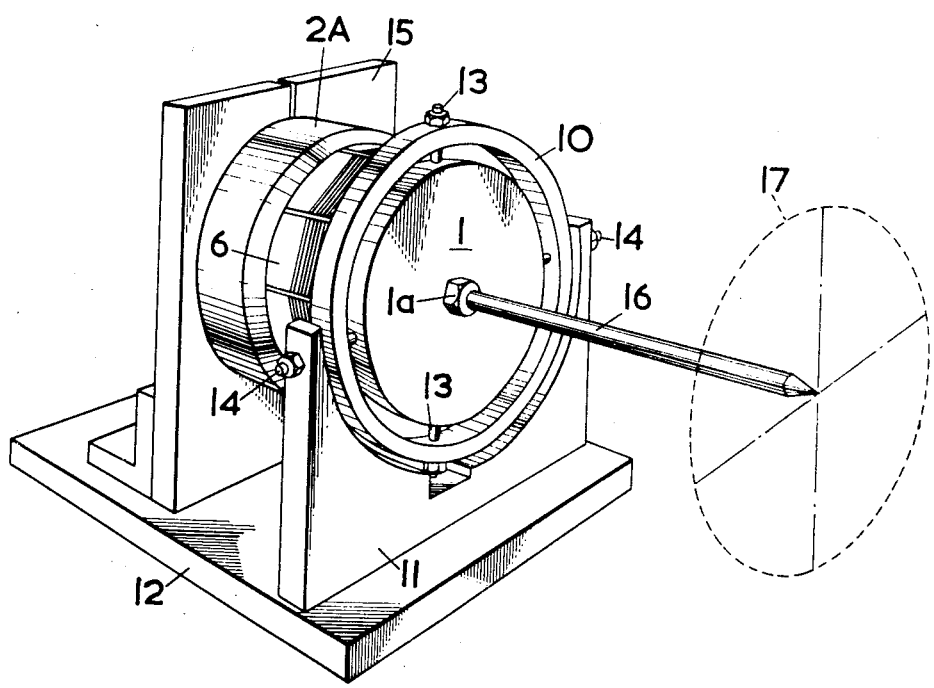

In order to make the invention clearer an example of a torque motor according to the invention will be described and the principles of operation discussed with reference to the accompanying drawings, in which:

Figs. 1a, b show schematically sectional elevations of a polar torque motor,

Figs. 2a, b show diagrams useful in understanding the design of such a motor, and Fig. 3 shows a pictorial view of a polar torque motor.

Figure 1B:
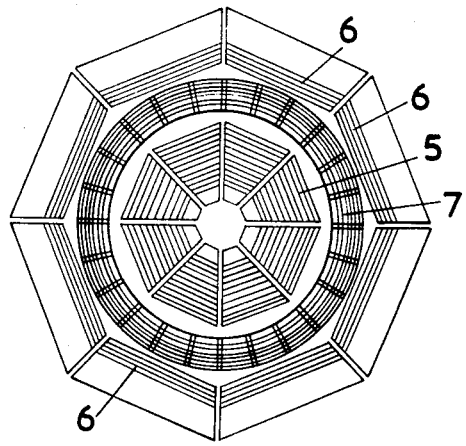

In Fig. 1 a rotor 1 which is mounted on gimbals (not shown) about a centre of rotation 1a comprises a hollow spherical magnetic shell coated with a thin layer of conducting material. The stator 2 consists of two concentrically mounted magnetic circuits 3 and 4 which are laminated concentrically of the stator; one circuit 3, has an inner central pole 5 and an outer annular pole 6, the other circuit 4, which is mounted between the poles 5 and 6, comprises a radially-slotted ring 7. In each case the magnetic circuits are completed by the hollow shell of the rotor 1.

Two sets of windings, 8 and 9, are carried on the stator 2, one for each magnetic circuit 3 and 4 respectively; there are no windings on the rotor 1. The winding 9, which is wound in the slotted ring 7, is a conventional two-phase two-pole winding. The other winding 8 comprises a solenoid wound around the central magnet pole 5.

A pictorial view of the motor is shown in Fig. 3 where a gimbal ring 10 and a gimbal mounting 11 are shown provided on a mounting base plate 12. The rotor 1 is able to pivot about its centre of rotation 1a by virtue of the pairs of bearings 13 and 14 in the gimbal ring 10 and the gimbal mounting 11 respectively.

The stator 2 of the torque motor is held in a frame 2A which is mounted on a mounting plate 15 itself mounted on the base plate 12. A pointer 16 is secured to the rotor 1 at its centre of rotation 1a and can indicate angular displacement against a scale 17 represented diagrammatically in broken line.

In operation the flux produced by the two-phase winding 9 is a two-pole rotating field flux in the air gap between the stator 2 and the rotor 1 and passes diametrically across the slotted ring 7, whilst the flux produced by the solenoid passes radially between the two poles 5 and 6. The solenoid winding 8 is fed with a single-phase alternating current signal.

The frequency of alternation of the eddy-currents created by the winding 8 is assumed to be the same as the frequency of rotation of the field created by the winding 9. Hence during every cycle, for any given phase of supply to the winding 8, a force will be set up by the interaction between the eddy currents and the rotating field. This force will change in direction as the field rotates; it will also change in magnitude, rising to a maximum and falling to zero twice each cycle as the single-phase current in the winding 8 passes through its peak and zero values.

Thus a pulsating force, the frequency of which is twice that of the single-phase alternating current, acts on the rotor 1. The direction of the mean of this force lies along a direction which is the direction of the rotating field at the instant that the current fed to he single phase winding 8 passes through its maximum value. If the relative phases remain unchanged, the direction of the mean force is also unchanged and a torque is set up which tends to rotate the rotor 1. The pointer 16 can act accordingly against any convenient load, for example a gyroscope; the direction of the torque is indicated at the scale 17.

When used as a polar motor a two-phase "reference" supply is fed to the two-phase winding 9 and an alternating current "signal" is fed to the single phase winding 8; the frequencies of the reference and signal currents are the same. Then the phase of the reference supply determines the orientation of reference axes with respect to which the signal can be referred. The phase of the resultant signal current determines the direction of the resultant torque in relation to the reference axes. The magnitude of the mean torque is proportional to the product of the single-phase current and the two-phase current, and when the latter is made constant, the mean torque is proportional to the mean of the modulus of the signal phase alternating current.

The basic parameters in the design of such a motor are torque, moment of inertia of moving parts, size, power consumption, and temperature rise. In one example a maximum moment of inertia was specified and it was stated that temperature rise was of little consequence. A maximum of 500 gm. cms. torque was required with a minimum of electrical power, and the dimensions were to be such that the motor could be inserted into a given, available space.

In such circumstances the design problem therefore largely resolves itself into providing optimum conditions for a maximum figure of merit which can be expressed as the ratio of output torque to total electrical power.

For a given size of rotor the torque is limited by the rate of heat dissipation by the spherical surface and by the saturation of the iron in the rotor. If the thickness of the iron in the rotor be fixed and maximum flux density in the iron maintained then increasing the thickness of the conductor coating increases the maximum torque but also increases the required dissipation in the same ratio; at the same time the inertia of the rotor is increased.

To get both low reluctance and good conductivity it is considered desirable to construct the rotor of a magnetic shell coated with a good conductor. It can be shown that the thickness of the conductor coating should be about ⅓ of the total thickness to develop maximum torque for a given inertia. However, owing to the resulting large air gap the stator becomes very inefficient. Therefore high maximum torque must be sacrificed somewhat if a good torque is to be obtained at reasonable efficiency.

As the proportion of iron in the rotor is increased the current in the iron should be taken into consideration. Since the currents in the iron and conductor are not in phase it is necessary to obtain their vector sum. Current loops in the iron will have high inductance and high resistance, whereas current loops in the conductor will have a lower inductance (which will vary somewhat with air gap), and will have a resistance proportional to $1/t$ where $t$ is the thickness of the conductor. Thus the power factors are difficult to estimate and optimum conditions are best obtained by experiment.

For a given flux density the flux inducing eddy currents in the rotor is limited by the cross section of the sphere at the central pole, hence this diameter should be as large as possible. On the other hand the figure of merit is increased by keeping the solenoid small. Therefore the central pole should be flared out at the air gap. Torque increases as the rotating field iron is increased until the rotor iron is saturated. Efficiency is increased as the width of the eddy current loop is reduced to the width of the field iron. Current flowing outside the field iron heats the rotor but does not add to the torque.

The outside diameter of the annular pole should be as large as permitted by the required movement of the rotor. The area within this diameter should be filled with as much iron as possible with due regard to saturation at the central pole and leakage between poles. Thus for given maximum diameter of the annular pole, the thickness of the field iron and the diameter of the central pole at the air gap and through the coil, should be matched so that the flux density in the iron is everywhere high without over saturation. In a theoretical analysis the field iron thickness disappears from the torque equation when it is made equal to the rotor thickness. In practice however, it would be necessary to increase the field iron thickness since cutting the teeth would reduce the area; furthermore, the air gap reluctance is reduced as the area is increased.

To determine the torque equation we refer to Figs. 2a, b.

Figure 2B:
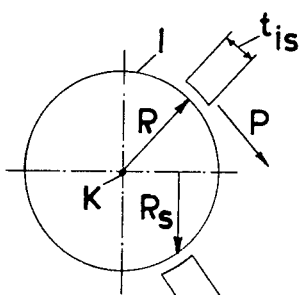

Fig. 2a illustrates a single, circular eddy current path in the surface of a sphere, where $d\theta$ is an elemental arc of the eddy-current path at an angle $\theta$ from a datum radius. Fig. 2b shows the poles of the annular ring producing the two-phase rotating field. R is the radius of the sphere, $R_s$ the radius of the circular eddy-current path, P the force on the eddy-current path and $t_{ls}$ is the thickness of the poles of the annular ring.

Assume uniform distribution of flux, i.e. constant flux density so that the force acting per unit angle will be constant for any part of the eddy-current path (EL of Fig. 2a).

Let this force be $P_0$.

Then the force acting on the element $d\theta$ is $$P_0 d\theta$$

The moment of this force about a point K at the centre of the sphere is $P_0 R\, d\theta$ and this will be constant for any element $d\theta$.

The resolved component of this moment about an axis through the centre of the sphere will be $$P_0 R \sin\theta d\theta$$

The total torque about the axis of the sphere produced by the eddy-current path in a two pole field will be $$T = 4.P_0 R \int_0^{\pi/2} \sin\theta d\theta$$

$$T = 4.P_0 R$$

The force on the arc subtending one radian will be $\tfrac{1}{2}\pi \times P$ the force on the whole path i.e. $P_0 = P/2$ $$\therefore T = 2PR/\pi \tag{1}$$

The magnitude of this torque will vary sinusoidally with time since the eddy-current in the path is alternating. Furthermore since the field is rotating at the same frequency as the alternating frequency of the eddy-current path the resolved component about a fixed axis will be a further sinusoidal function.

$T = (2PR/\pi) \sin^2 wt$ and the average value of this torque will be $$T = P_{\max}.R/\pi \tag{2}$$

It can be shown that the torque due to currents in the conductor shell $$T_c = \frac{B^2_{\max} \times 2\pi f 10^{-8} d_p t_{lr}^2 t_c \cos\phi_c R}{9810 \rho_c}$$

where:

$B_{\max}$ is the maximum flux the magnetic shell of the sphere will carry, $d_p$ is the diameter of the central pole on which the eddy-current solenoid is wound,
$t_{lr}$ is the thickness of the magnetic shell of the sphere,
$t_c$ is the thickness of the conducting layer of the sphere,
$\cos\phi_c$ is the power factor of the eddy-current paths, and
$\rho_c$ is the specific resistance of the eddy-current path.

For the motor of the example $f = 400$ cycles per sec.
$d_p = 4$ cm.
$t_{tr} = .071$ cm.
$t_c = .038$ cm.
$R = 5.08$ cm.
$c = 2.87 \times 10^{-6}$ ohms per cm.³ (aluminium)
$B_{max.} = 15,000$ lines per sq. cm. ("Ferrosil")
$\cos \phi_c = 0.8$ assumed for the conductor in the air gap $$T_c = \frac{15,000^2 \times 2 \times 400 \times 10^{-8} \times 4 \times .071^2 \times .038 \times .8 \times 5.08}{9810 \times 2.87 \times 10^{-6}}$$

$T_c = 500$ gm. cm.

Under maximum continuous loading a typical motor consumed approximately 35 watts for the rotating field, or reference, windings and approximately 9 watts for the eddy-current, or signal, winding. The torque was then between 520 and 540 gm. cm. thus giving an efficiency of about 12 gm. cm. per watt. The rotor moment of inertia was 2,500 gm. cm.

The rotor shell used for the motor consisted of a 0.028" "Ferrosil" shell coated with 0.005" copper or 0.015" aluminium. The thin coating of copper is more efficient at lower signal currents but the iron then saturates sooner with increasing current. The inertias of the two are very similar.

Although the air gap is larger for the thicker aluminium coating, torque is as high as for the thin coating of copper with consequently a smaller air gap and a higher flux. This may be due to the lower reactance of the eddy-current path with increased air gap which would tend to increase induced current and may at the same time make a better power factor match with the eddy-currents in the iron.

What we claim is:

1. A torque motor comprising in combination a conductive sheet, an electromagnetic field system for setting up eddy currents in the configuration of a closed path on the sheet when energised by a single-phase alternating current of a given frequency, and a further field system for establishing a rotating field flux which cuts the current path so that due to interaction of flux and current a thrust results in a direction tangentially of the sheet, whereby when the further field system is energised by alternating current of the given frequency the resultant rotating field flux rotates at the given frequency and the tangential thrust experienced by the sheet is determined in magnitude by the product of the magnitudes of the field energising currents and in direction by their relative phase.

2. A torque motor comprising in combination a conductive sheet, a first electromagnetic field system for setting up eddy currents in the sheet, when energised by a single-phase alternating current of a given frequency, which follow a closed path configuration on the surface of the sheet, a second electromagnetic field system fixed relative to the first field system for establishing a rotating field having a number of pole pairs the flux of which cuts the eddy current path and whose poles in rotating follow round the eddy current path, the interaction of the flux and current causing a thrust in a direction tangentially of the sheet, whereby when the second field is energised by alternating current of the same given frequency, the sheet experiences a thrust in a tangential direction which is determined in magnitude by the product of the magnitudes of the energising currents and in direction from the centre of the poles of the rotating field according to their relative phase.

3. A torque motor as claimed in claim 2 wherein the means for setting up a rotating field flux comprises a two-pole, two-phase winding.

4. A torque motor as claimed in claim 2, wherein the conductive sheet comprises at least part of a sphere having a conductive, magnetic surface portion, mounting means for mounting the sphere to be rotatable about its centre of rotation and to maintain the surface portion, the field system and the means for setting up a rotating field flux in cooperating relation during movement under the action of a torque due to the tangential thrust acting about the centre of rotation.

5. A torque motor as claimed in claim 4, wherein the magnetic circuit comprises an assembly of circumferentially laminated sectors of general U-shaped cross-section.

6. A torque motor as claimed in claim 5, wherein the annular magnetic ring comprises a circumferentially laminated ring concentric with the outer and centre pole-pieces and defining radial winding slots in a face opposing the sphere.

7. A torque motor as claimed in claim 6, wherein the outer and centre pole-pieces and the face of the laminated ring define a spherically concave surface.

8. A torque motor as claimed in claim 7, wherein the mounting means comprises a set of gimbals.

9. A torque motor as claimed in claim 3, wherein the conductive sheet comprises at least part of a sphere having a conductive, magnetic surface portion, mounting means for mounting the sphere to be rotatable about its centre of rotation and to maintain the surface portion, the field system and the means for setting up a rotating field flux in cooperating relation during movement under the action of a torque due to the tangential thrust acting about the centre of rotation.

10. A torque motor as claimed in claim 9, wherein the magnetic circuit comprises an assembly of circumferentially laminated sectors of general U-shaped cross-section.

11. A torque motor as claimed in claim 10, wherein the annular magnetic ring comprises a circumferentially laminated ring concentric with the outer and centre pole-pieces and defining radial winding slots in a face opposing the sphere.

12. A torque motor as claimed in claim 11, wherein the outer and centre pole pieces and the face of the laminated ring define a spherically concave surface.

13. A torque motor as claimed in claim 12, wherein the mounting means comprises a set of gimbals.

14. A torque motor as claimed in claim 2, wherein the electromagnetic field system comprises a magnetic circuit having an outer pole-piece surrounding a centre pole-piece, said pole pieces opposing part of said conductive sheet, and a winding for energising the magnetic circuit, and wherein the means for setting up a rotating field flux comprises an annular ring of magnetic material located between said centre and outer pole-pieces and defining radial winding slots, and a winding wound in said slots, said conductive sheet including magnetic material to give said sheet an effective magnetic permeability greater than unity.

15. A torque motor as claimed in claim 14, wherein the conductive, magnetic sheet comprises at least part of a sphere having a conductive, magnetic surface portion, mounting means for mounting the sphere to be rotatable about its centre of rotation and to maintain the surface portion, the field system and the means for setting up a rotating field flux in cooperating relation during movement under the action of a torque due to the tangential thrust acting about the centre of rotation.

16. A torque motor as claimed in claim 15, wherein the magnetic circuit comprises an assembly of circumferentially laminated sectors of general U-shaped cross-section.

17. A torque motor as claimed in claim 16, wherein the annular magnetic ring comprises a circumferentially laminated ring concentric with the outer and centre pole-pieces and defining radial winding slots in a face opposing the sphere.

18. A torque motor as claimed in claim 17, wherein the outer and centre pole-pieces and the face of the laminated ring define a spherically concave surface.

19. A torque motor as claimed in claim 18 wherein the mounting means comprises a set of gimbals.

References Cited in the file of this patent

UNITED STATES PATENTS

| | | |
|---|---|---|
| 561,144 | Trudeau | June 2, 1896 |
| 606,033 | Scott | June 21, 1898 |
| 1,761,759 | Trombetta | June 3, 1930 |
| 1,994,324 | Suits | Mar. 12, 1935 |
| 2,200,104 | Sonnemann | May 7, 1940 |
| 2,474,549 | Schoeppel | June 28, 1949 |
| 2,669,126 | Simmons et al. | Feb. 16, 1954 |
| 2,700,739 | Orlando | Jan. 25, 1955 |